(12) United States Patent
Chapman

(10) Patent No.: US 9,505,476 B2
(45) Date of Patent: Nov. 29, 2016

(54) MOTORIZED WATERCRAFT

(71) Applicant: Jamie Jon Chapman, Bonita Springs, FL (US)

(72) Inventor: Jamie Jon Chapman, Bonita Springs, FL (US)

( * ) Notice: Subject to any disclaimer, the term of this patent is extended or adjusted under 35 U.S.C. 154(b) by 0 days.

(21) Appl. No.: 15/000,962

(22) Filed: Jan. 19, 2016

(65) Prior Publication Data

US 2016/0207603 A1 Jul. 21, 2016

Related U.S. Application Data

(60) Provisional application No. 62/104,490, filed on Jan. 16, 2015.

(51) Int. Cl.

| B63H 21/14 | (2006.01) |
|---|---|
| B63H 21/17 | (2006.01) |
| B63H 1/14 | (2006.01) |
| B63H 5/14 | (2006.01) |
| B63H 21/00 | (2006.01) |
| B63H 21/21 | (2006.01) |

(52) U.S. Cl.
CPC .............. *B63H 21/17* (2013.01); *B63H 1/14* (2013.01); *B63H 5/14* (2013.01); *B63H 21/21* (2013.01); *B63H 21/24* (2013.01); *B63H 2021/003* (2013.01); *B63H 2021/171* (2013.01); *B63H 2021/216* (2013.01)

(58) Field of Classification Search
CPC ...................................................... B63H 21/17
USPC .............................................................. 440/6
See application file for complete search history.

(56) References Cited

U.S. PATENT DOCUMENTS

| 5,964,178 A * | 10/1999 | Gonda ...................... B63B 7/06 |
|---|---|---|
| | | 114/347 |
| 2013/0305979 A1* | 11/2013 | Cassanas ................ B63B 7/082 |
| | | 114/331 |

\* cited by examiner

*Primary Examiner* — Lars A Olson
*Assistant Examiner* — Jovon Hayes

(57) ABSTRACT

A motorized watercraft is a vehicle that is used to transport a user across the water. The motorized watercraft includes a floating board, a control unit, a propulsion system, a power source, and a plurality of conduit stringers. The floating board allows a user to float above the water. The propulsion system is used to supplement or replace human exertion as a means of propelling the floating board across the water. The control unit is mounted to the deck of the floating board and is used to regulate the speed of the propulsion system and may be used to control lights which are mounted into the floating board. The power source is used to provide the energy needed for running the propulsion system and the lights. The plurality of conduit stringers run through the floating board, strengthening the floating board and providing channels through which wiring may run.

14 Claims, 7 Drawing Sheets

MOTORIZED WATERCRAFT

The current application claims a priority to the U.S. Provisional Patent application Ser. No. 62/104,490 filed on Jan. 16, 2014. The current application is filed on the next business day, which is Jan. 19, 2015 while Jan. 16, 2015 was on a weekend and Jan. 18, 2015 was on a national holiday (Martin Luther King Jr. Day).

FIELD OF THE INVENTION

The present invention relates generally to motorized watercraft. More specifically, the present invention is a solar powered watercraft which used a plurality of conduit stringers to structurally reinforce the floating board, while also providing an electrical infrastructure.

BACKGROUND OF THE INVENTION

Paddle boards and surfboards are widely used for activities on the water. Both require that the user exert large amounts of energy in order to propel the board. As a result, users are generally limited in terms of how long they can stay on the water and how far they can travel before exhaustion sets in. In contrast, motorboats and sailboats generally require little to no physical exertion. However, various laws and regulations are being put in place to limit pollution that is caused by the use of motor boats, thus putting restrictions on their use. Sailboats avoid the problem of pollution, but they require favorable weather conditions if they are to be operated.

Accordingly, there is a present need for a water craft that can aid or replace user propulsion while also operating without releasing pollutants into the surrounding body of water. The present invention is a motorized watercraft that is powered using one or more solar panels which may be supplemented with energy from a battery or other form of attachable power source. The various electrical components of the present invention are wired through a plurality of conduit stringers which, not only, allow power and data to be transferred throughout the watercraft, but also act as structural reinforcing members which allow the invention to flex without breaking.

DETAILED DESCRIPTION OF THE INVENTION

All illustrations of the drawings are for the purpose of describing selected versions of the present invention and are not intended to limit the scope of the present invention.

Figure 1:
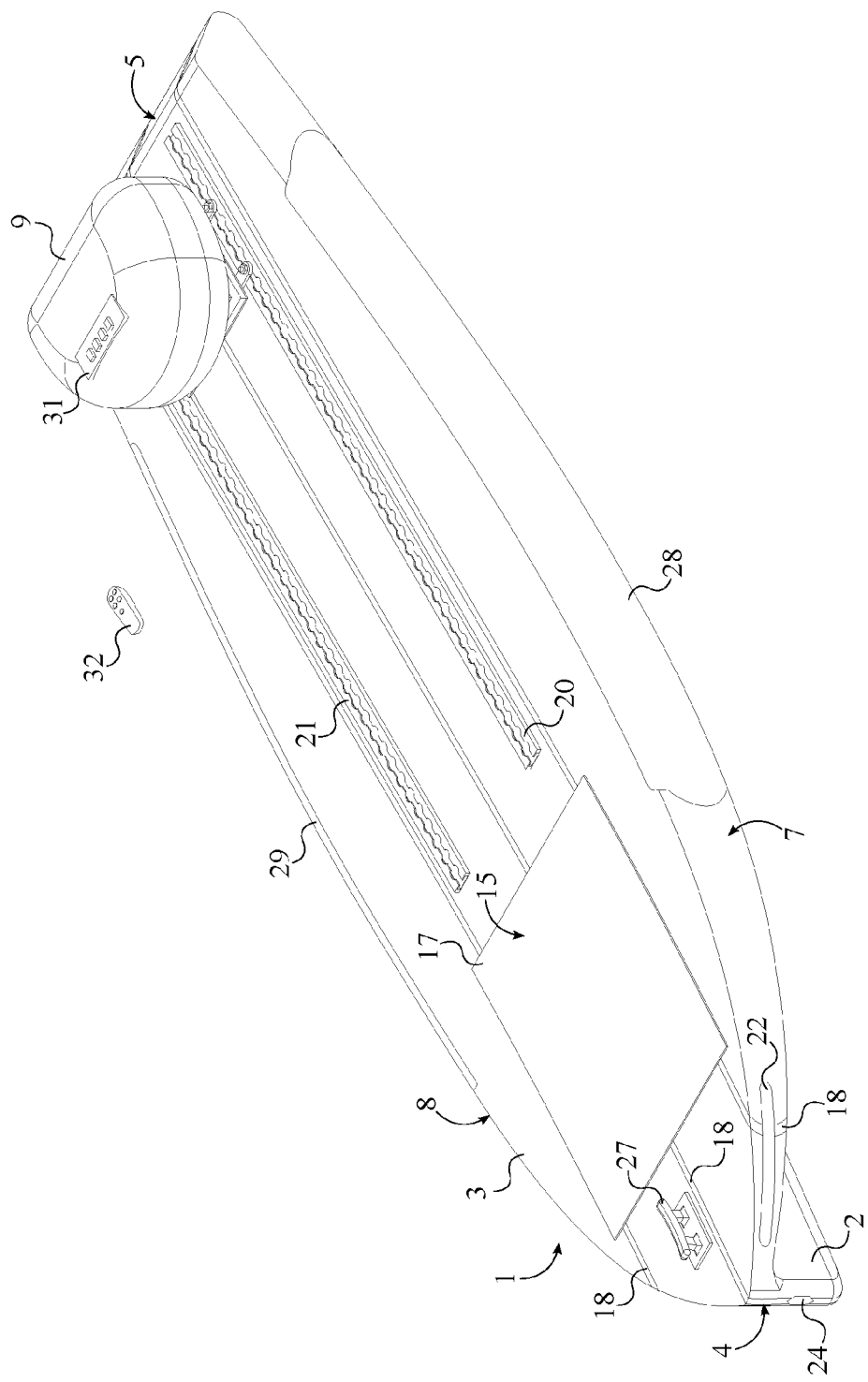
FIG. 1 is a top right perspective view of the present invention, showing the remote control.
Figure 2:
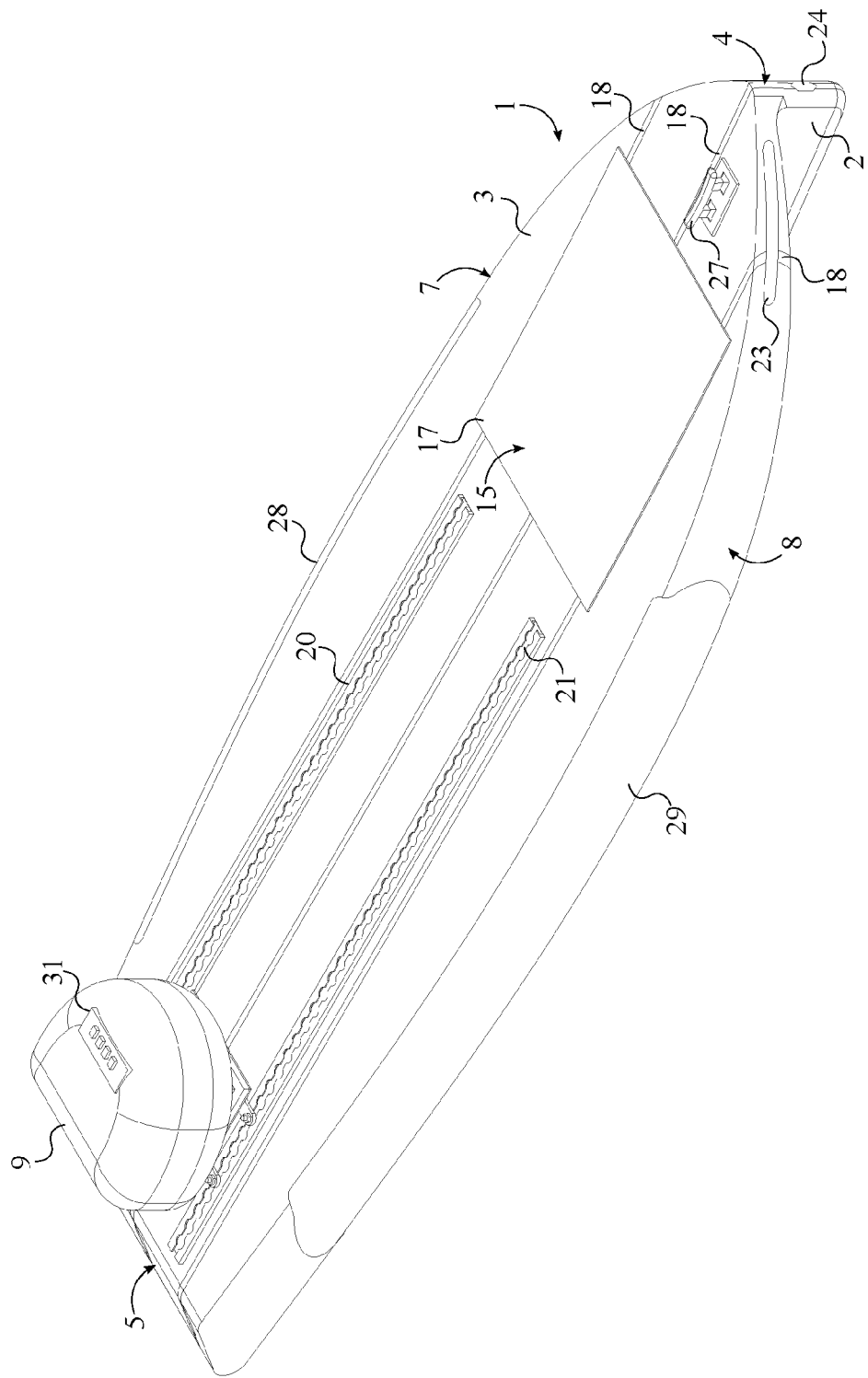
FIG. 2 is a top left perspective view of the present invention.
Figure 3:
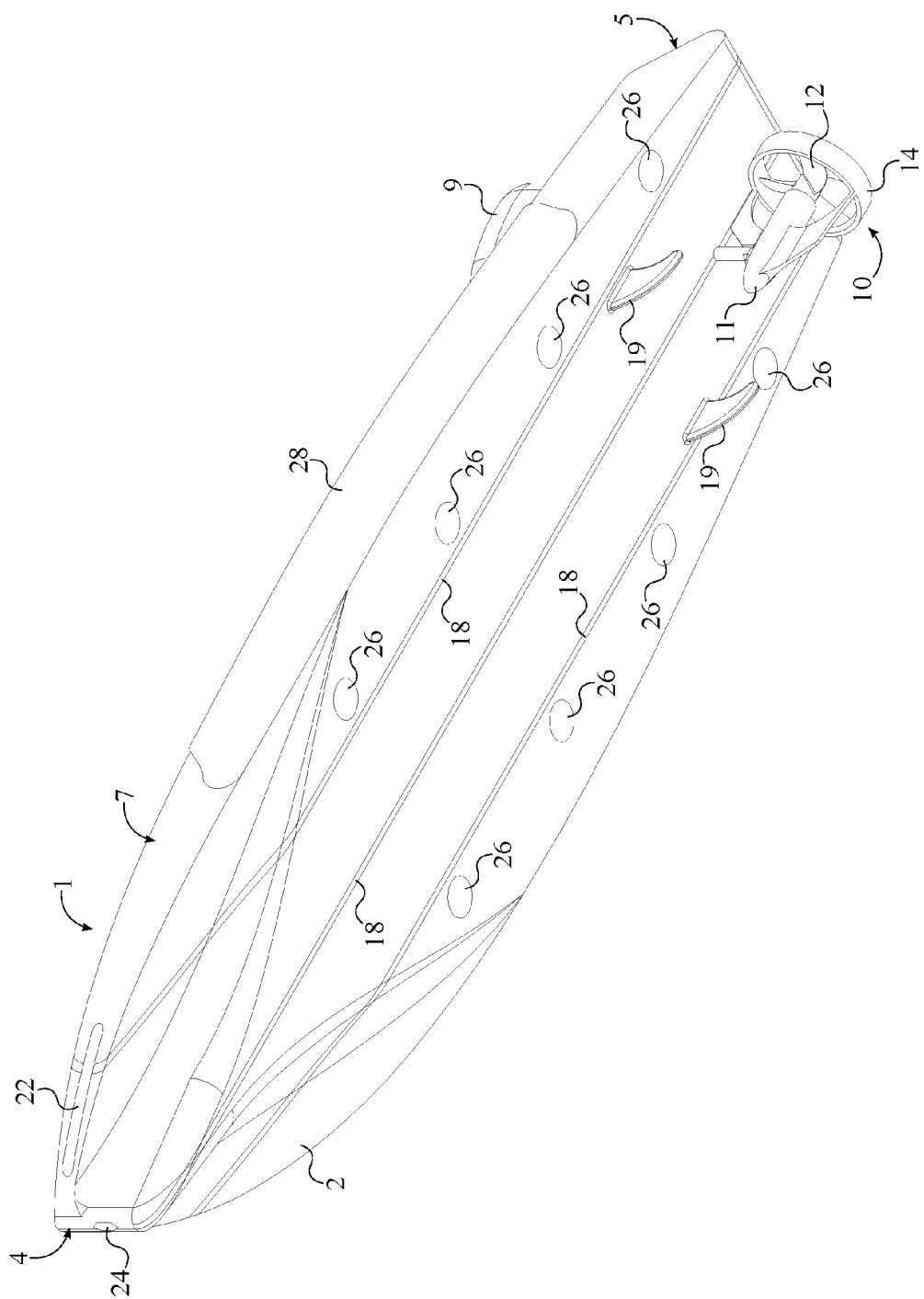
FIG. 3 is a bottom right perspective view of the present invention.

With reference to FIGS. 1-3, the present invention is a motorized watercraft that is used to propel a user across the water. The present invention comprises a floating board 1, a control unit 9, a propulsion system 10, a power source 15, and a plurality of conduit stringers 18. The floating board 1 is a buoyant platform that is used to keep a user afloat while on the water. The floating board 1 comprises a hull 2, a deck 3, a fore end 4, and an aft end 5. In the preferred embodiment of the present invention, the floating board 1 resembles a paddleboard; however, other shapes may alternatively be used. The fore end 4 and the aft end 5 are positioned opposite to each other across the floating board 1. The deck 3 is connected adjacent and along the hull 2. The deck 3 provides a platform upon which a user may stand, sit, or lay. The hull 2 is used to displace water in order to create a buoyant force which is large enough to keep the user afloat. The control unit 9 provides a means of regulating the propulsion system 10 and various other features of the present invention. The control unit 9 is mounted adjacent to the deck 3, opposite to the hull 2. This arrangement is necessary to keep the control unit 9 out of the water and prevents the control unit 9 from interfering with the flow of water across the hull 2. The propulsion system 10 is mounted adjacent to the hull 2, opposite to the deck 3. The propulsion system 10 is positioned adjacent to the aft end 5 and may be used to supplement or replace human exertion to propel the floating board 1 across the water. The power source 15 is electrically connected to the control unit 9 and the control unit 9 is electrically connected to the propulsion system 10. This arrangement allows the control unit 9 to regulate the speed of the propulsion system 10.

Figure 7:
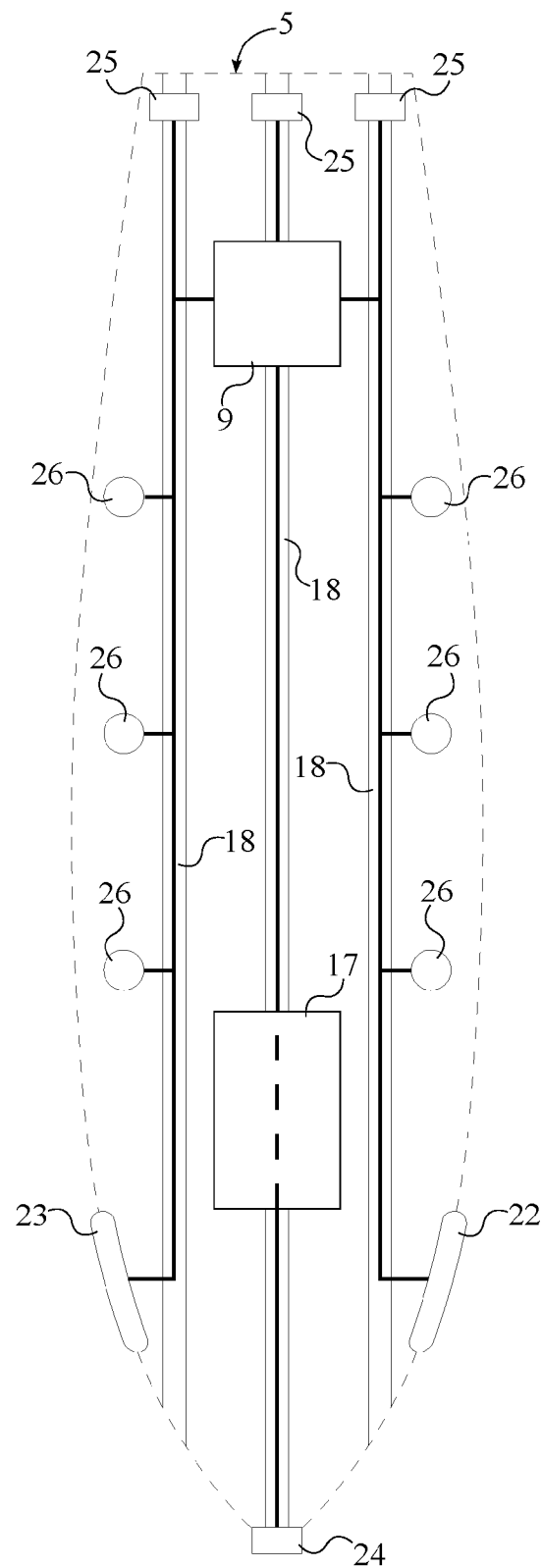
FIG. 7 is a schematic drawing of the present invention showing the electrical connections which are made through the plurality of conduit stringers.

In reference to FIG. 1 and FIG. 7, the plurality of conduit stringers 18 is integrated into the floating board 1. The plurality of conduit stringers 18 traverses from the fore end 4 to the aft end 5 and strengthens the floating board 1. The plurality of conduit stringers 18 also allows the floating board 1 to flex without breaking. Moreover, the plurality of conduit stringers 18 provides a path through which electrical connections can be made. To maximize the strength of the floating board 1 and provide electricity to all necessary components of the present invention, the plurality of conduit stringers 18 is distributed across the floating board 1.

In reference to FIG. 3, the present invention further comprises a plurality of stabilizing fins 19. The plurality of stabilizing fins 19 is mounted adjacent to the hull 2 and positioned opposite to the deck 3 and is used to help the user maintain control of the present invention while on the water. The plurality of stabilizing fins 19 is positioned adjacent to the propulsion system 10 and positioned opposite to the aft end 5. In the preferred embodiment of the present invention, plurality of stabilizing fins 19 comprises two fins; however, any number of stabilizing fins 19 may be used in alternative embodiments.

Figure 5:
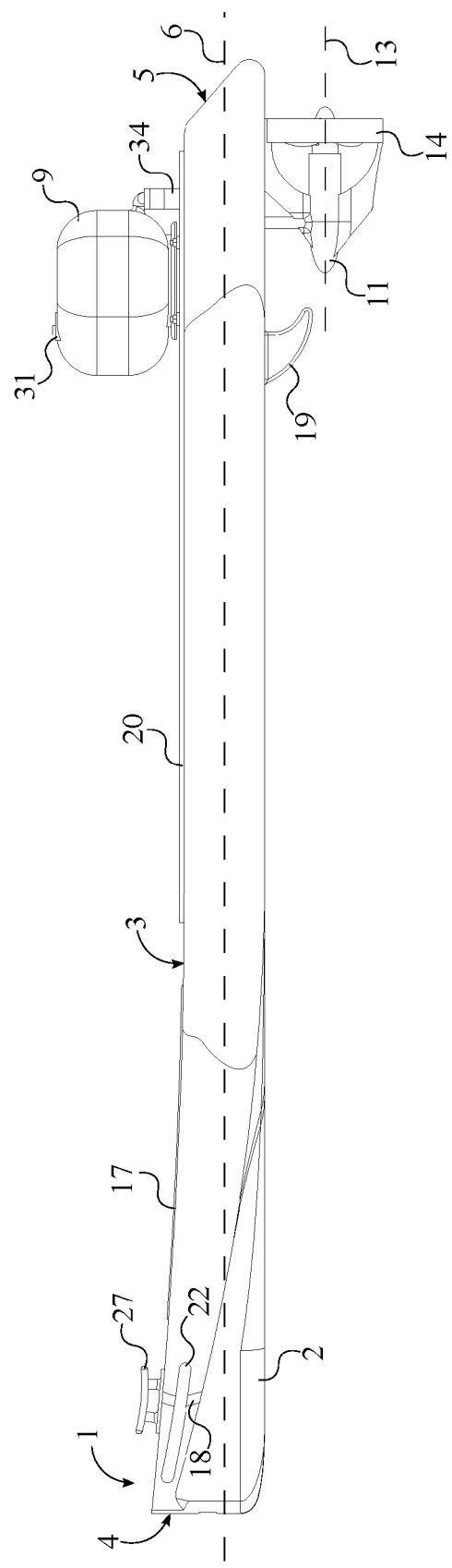
FIG. 5 is a right side view of the present invention.

In reference to FIG. 3 and FIG. 5, the propulsion system 10 comprises a motor 11, a propeller 12, and a propeller guard 14. The motor 11 is mounted into the hull 2 and positioned opposite to the deck 3. Specifically, a shaft of the motor 11 is mounted into the hull 2. The motor 11 is used to rotate the propeller 12 and is electrically connected to the control unit 9. In order to protect the electrical connection between the motor 11 and the control unit 9, a waterproof seal is positioned about the shaft of the motor 11 within the hull 2. The propeller 12 is used to accelerate water in order to generate thrust for the floating board 1. The propeller 12 is operatively coupled to the motor 11 such that as the motor 11 rotates, the propeller 12 rotates. A central axis 6 of the floating board 1 traverses from the fore end 4 to the aft end 5. The motor 11 is mounted along the central axis 6 and a rotation axis 13 of the propeller 12 is positioned parallel to the central axis 6. This arrangement causes the propeller 12 force water away from the fore end 4, thus pushing the present invention forward. The propeller guard 14 is connected about the motor 11. The propeller guard 14 encircles the propeller 12 in order to prevent the user from sustaining an injury as a result of contacting a spinning propeller 12. Furthermore, the propeller guard 14 helps to prevent the propeller 12 from getting tangled in seaweed or striking against land, rocks, or debris.

In the preferred embodiment of the present invention, the power source 15 comprises a battery 16 and a solar panel 17. The battery 16 is mounted within the control unit 9 and is used to provide power for various components of the present invention. In reference to FIG. 1, the solar panel 17 is mounted adjacent to the deck 3 and positioned opposite to the hull 2. The solar panel 17 is positioned adjacent to the fore end 4 and is used to recharge the battery 16. Under most situations, the user will be situated adjacent to the aft end 5 of the floating board 1. Because the solar panel 17 is positioned adjacent to the fore end 4, the amount of sunlight that is blocked by the user is minimized. The solar panel 17 is electrically connected to the control unit 9 through at least one stringer from the plurality of conduit stringers 18. Because the electrical connection between the solar panel 17 and the battery 16 is made through at least one stringer from the plurality of conduit stringers 18, any necessary wires are kept away from the user and are shielded from water. The battery 16 is electrically connected to the control unit 9 so that the control unit 9 may be used to regulate how much power is directed to various components of the present invention.

Figure 4:
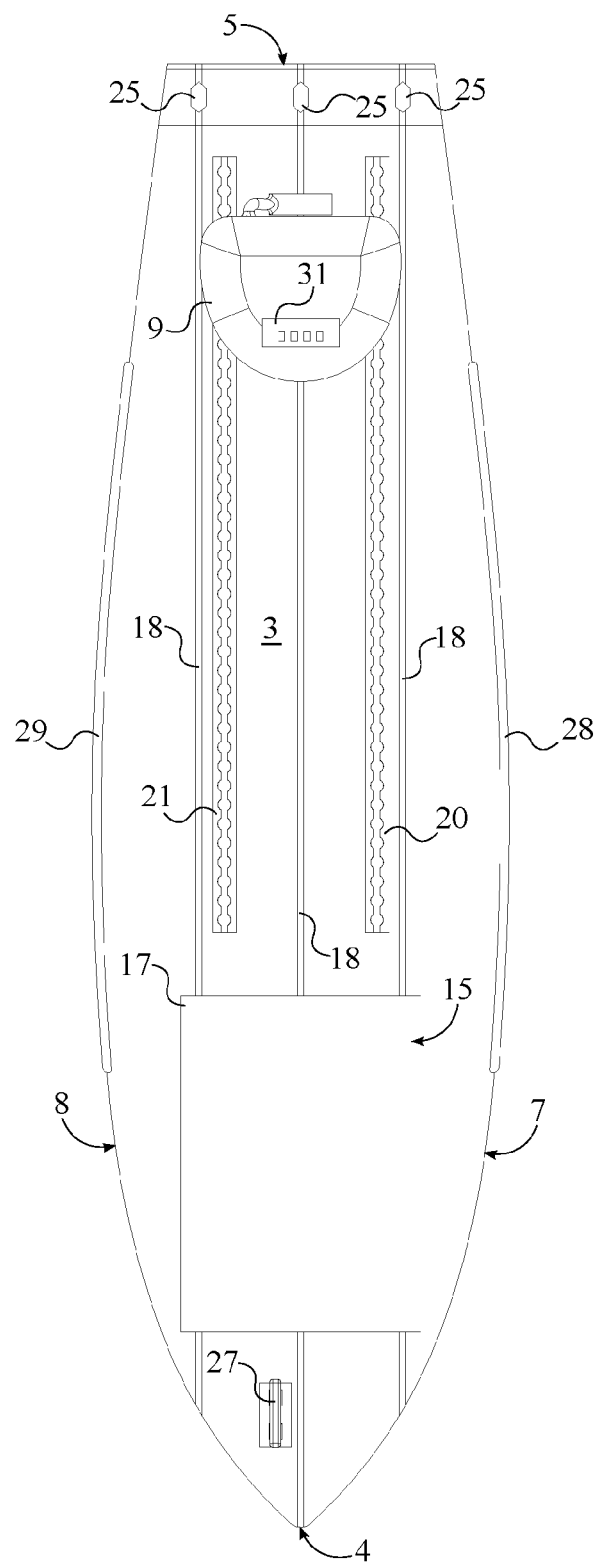
FIG. 4 is a top view of the present invention.

In reference to FIG. 4, the present invention further comprises a first mounting rail 20 and a second mounting rail 21. The first mounting rail 20 and the second mounting rail 21 are embedded into the deck 3 and are used to mount attachments to the deck 3. The first mounting rail 20 and the second mounting rail 21 are positioned offset from the fore end 4 and are positioned offset and equidistant from the central axis 6. This arrangement ensures that the any attachments mounted to the floating board 1 are centered and do not cause the floating board 1 to tip. In the preferred embodiment of the present invention, the first mounting rail 20 and the second mounting rail 21 are L-track rails; however, various other types of rails may be used. The control unit 9 is mounted to the deck 3 by the first mounting rail 20 and the second mounting rail 21. Furthermore, the first mounting rail 20 and the second mounting rail 21 may be used to mount a seat, a fishing rod holder, a cooler, a fish finding device, or various other peripheral attachments.

In reference to FIGS. 1-2, the present invention further comprises a first lateral light 22 and a second lateral light 23, which are used to make the present invention visible at night and in poor weather conditions. The floating board 1 comprises a port side 7 and a starboard side 8. The port side 7 and the starboard side 8 are positioned opposite to each other across the floating board 1. The port side 7 and the starboard side 8 are positioned in between the fore end 4 and the aft end 5. The first lateral light 22 is mounted into the port side 7 and the second lateral light 23 is mounted into the starboard side 8. In the preferred embodiment, the first lateral light 22 and the second lateral light 23 are given corresponding colors which follow boating and watercraft regulations. This arrangement makes it easy for people on other watercraft to identify the present invention and discern the orientation of the present invention. The first lateral light 22 and the second lateral light 23 are electrically connected to the control unit 9 through the plurality of conduit stringers 18. This arrangement allows the user to easily toggle the first lateral light 22 and the second lateral light 23 on and off.

In addition to the first lateral light 22 and the second lateral light 23, the present invention further comprises a front light 24 and a plurality of rear lights 25. In reference to FIG. 1 and FIG. 4, the front light 24 is mounted into the fore end 4 and the plurality of rear lights 25 is mounted into the aft end 5. The front light 24 is used to illuminate the area in front of the present invention and is also used to make the present invention easily visible from the front side. The plurality of rear lights 25 is distributed across the aft end 5 and is used to make the aft end 5 of the floating board 1 easily visible. The front light 24 and the plurality of rear lights 25 are electrically connected to the control unit 9 through the plurality of conduit stringers 18. Similar to the first lateral light 22 and the second lateral light 23, the front light 24 and the plurality of rear lights 25 may be regulated by the control unit 9.

In reference to FIG. 3, the present invention further comprises a plurality of hull lights 26. The plurality of hull lights 26 are mounted into the hull 2, opposite to the deck 3 and are used to illuminate the area directly below the floating board 1. This is useful when fishing under low-light conditions. In order to maximize their effectiveness, the plurality of hull lights 26 is distributed across the hull 2. In order to prevent water damage, the plurality of hull lights 26 is electrically connected to the control unit 9 through the plurality of conduit stringers 18. Similar to the other light options of the present invention, the plurality of hull lights 26 may be easily turned on or off by the user through the control unit 9.

In reference to FIG. 5, the present invention further comprises an electrical junction box 34. Because the propulsion system 10, the first lateral light 22, the second lateral light 23, the front light 24, the plurality of rear lights 25, and the plurality of hull lights 26 are wired through the floating board 1, and the control unit 9 is mounted external to the floating board 1, a waterproof connection between floating board 1 and the control unit 9 is necessary. The electrical junction box 34 is electrically connected in between the plurality of conduit stringers 18 and the control unit 9. The electrical junction box 34 is mounted into the deck 3 and is positioned in between the control unit 9 and the aft end 5. This configuration allows the control unit 9 to be easily connected to and disconnected from the electrical junction box 34 to perform maintenance if needed.

In reference to FIG. 1, the present invention further comprises a cleat 27. The cleat 27 is mounted adjacent to the deck 3 and positioned opposite to the hull 2. The cleat 27 is positioned adjacent to the fore end 4 and is used to secure the floating board 1 to a dock, to land, or to another watercraft. The cleat 27 may also be used attach a kite to the floating board 1.

In reference to FIGS. 1-2, the present invention further comprises a first grip 28 and a second grip 29. The first grip 28 is externally layered over the port side 7 and the second grip 29 is externally layered over the starboard side 8. The first grip 28 and the second grip 29 are used to prevent the user from slipping off the floating board 1. Moreover, the first grip 28 and the second grip 29 help to make the floating board 1 easier to hold onto while the user is carrying the floating board 1 or while the user is getting onto or off of the floating board 1.

Figure 6:
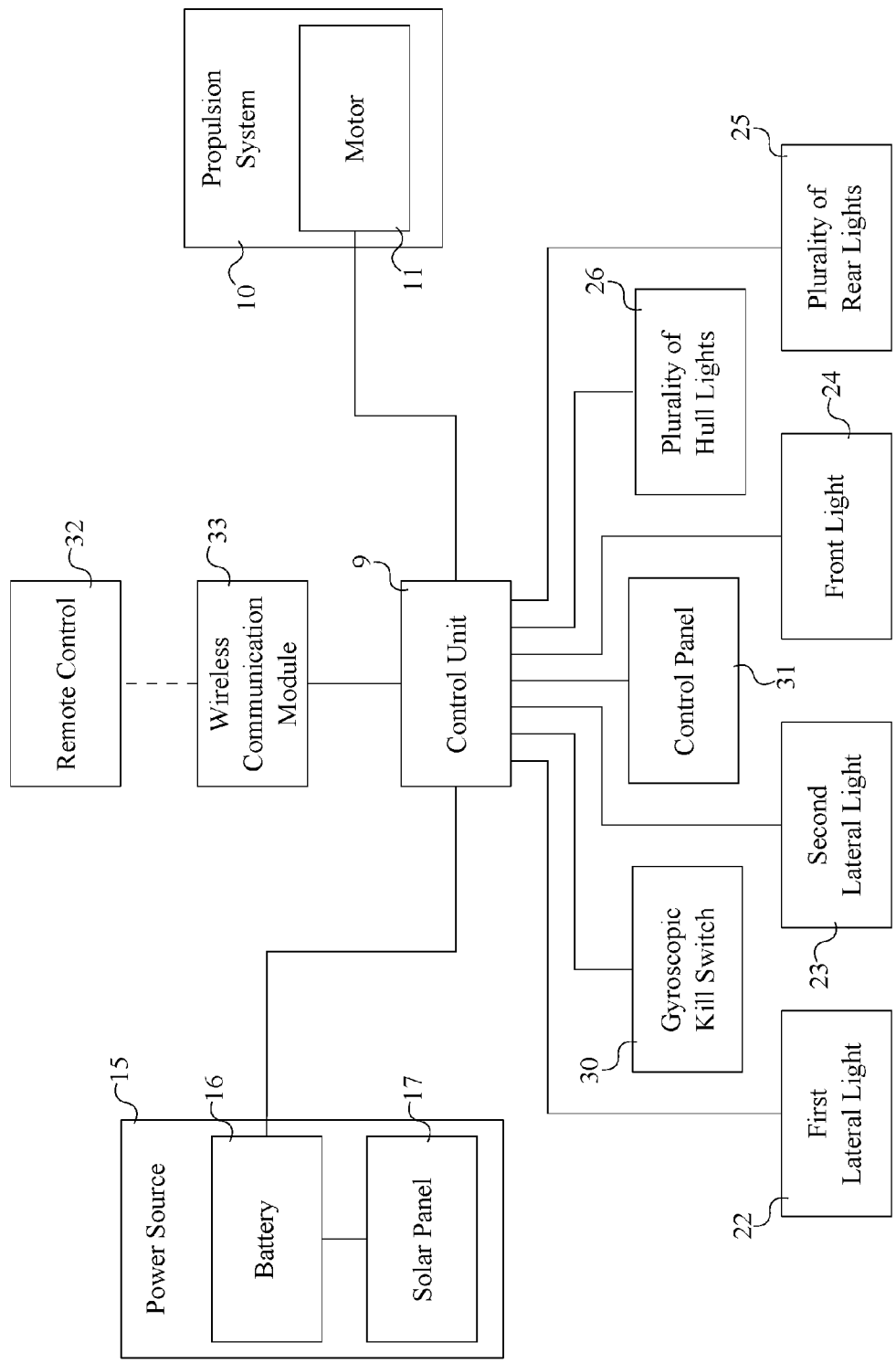
FIG. 6 is an electrical schematic diagram of the present invention.

In reference to FIG. 6, the present invention further comprises a gyroscopic kill switch 30. The gyroscopic kill switch 30 is electronically connected to the control unit 9 and is housed within the control unit 9. The gyroscopic kill switch 30 is used to prevent the propulsion system 10 from running if the floating board 1 is detected to have tipped over. In the preferred embodiment, the gyroscopic kill switch 30 cuts power to the propulsion system 10 if the floating board 1 tips more than 45°; however, any other angular threshold may alternatively be used. Furthermore, in its preferred embodiment, the present invention comprises a kill cord. Similar to the gyroscopic kill switch 30, the kill cord is used to cut power to the propulsion system 10 under certain situations. The kill cord is attached into the control unit 9 and may be tethered to the user. The control unit 9 is configured to stop the propulsion system 10 if the kill cord is removed from the control unit 9. A removal of the kill cord from the control unit 9 is meant to signify that the user has fallen off the floating board 1. Accordingly, the propulsion system 10 is turned off to prevent injury as well as limit how far the floating board 1 travels from the user.

In reference to FIG. 4, the present invention further comprises a control panel 31. The control panel 31 is mounted into the control unit 9 and is electronically connected to the control unit 9. The control panel 31 allows the user to control the propulsion system 10, the first lateral light 22, the second lateral light 23, the front light 24, the plurality of rear lights 25, and the plurality of hull lights 26. Moreover, if the user attaches additional electronic equipment to the floating board 1, the control panel 31 may be used to regulate such equipment. In the preferred embodiment of the present invention, the control panel 31 comprises a plurality of switches for each of the aforementioned components; however, other configurations, including the implementation of a touch screen, may alternatively be used.

In reference to FIG. 1, the present invention further comprises a remote control 32 and a wireless communication module 33. The wireless communication module 33 is electronically connected to the control unit 9 and is housed within the control unit 9. The wireless communication module 33 is communicably coupled to the remote control 32, allowing user to regulate the propulsion system 10, the first lateral light 22, the second lateral light 23, the front light 24, the plurality of rear lights 25, and the plurality of hull lights 26, while standing on the deck 3. The remote control 32 may be used in conjunction with the control panel 31 or may, alternatively, be used instead of the control panel 31.

Although the invention has been explained in relation to its preferred embodiment, it is to be understood that many other possible modifications and variations can be made without departing from the spirit and scope of the invention as hereinafter claimed.

What is claimed is:

1. A motorized watercraft comprises:
   a floating board;
   a control unit;
   a propulsion system;
   a power source;
   a plurality of conduit stringers;
   the floating board comprises a hull, a deck, a fore end, and an aft end;
   the fore end and the aft end being positioned opposite to each other across the floating board;
   the deck being connected adjacent and along the hull;
   the control unit being mounted adjacent to the deck, opposite to the hull;
   the propulsion system being mounted adjacent to the hull, opposite to the deck;
   the propulsion system being positioned adjacent to the aft end;
   the power source being electrically connected to the control unit;
   the control unit being electrically connected to the propulsion system;
   the plurality of conduit stringers being integrated into the floating board;
   the plurality of conduit stringers traversing from the fore end to the aft end; and
   the plurality of conduit stringers being distributed across the floating board.

2. The motorized watercraft as claimed in claim 1 comprises:
   a plurality of stabilizing fins;
   the plurality of stabilizing fins being mounted adjacent to the hull, opposite to the deck; and
   the plurality of stabilizing fins being positioned adjacent to the propulsion system, opposite to the aft end.

3. The motorized watercraft as claimed in claim 1 comprises:
   the propulsion system comprises a motor, a propeller, and a propeller guard;
   the motor being mounted into the hull, opposite to the deck;
   the motor being electrically connected to the control unit;
   the propeller being operatively coupled to the motor, wherein the motor is used to rotate the propeller;
   a central axis of the floating board traversing from the fore end to the aft end;
   a rotation axis of the propeller being positioned parallel to the central axis;
   the propeller guard being connected about the motor; and
   the propeller guard encircling the propeller.

4. The motorized watercraft as claimed in claim 1 comprises:
   the power source comprises a battery and a solar panel;
   the battery being mounted within the control unit;
   the solar panel being mounted adjacent to the deck, opposite to the hull;
   the solar panel being positioned adjacent to the fore end;
   the solar panel being electrically connected to the control unit through an at least one stringer from the plurality of conduit stringers; and
   the battery being electrically connected to the control unit.

5. The motorized watercraft as claimed in claim 1 comprises:
   the power source comprises a battery;
   the battery being mounted within the control unit; and
   the battery being electrically connected to the control unit.

6. The motorized watercraft as claimed in claim 1 comprises:
   a first mounting rail;
   a second mounting rail;
   the first mounting rail and the second mounting rail being embedded into the deck;
   the first mounting rail and the second mounting rail being positioned offset from the fore end;
   a central axis of the floating board traversing from the fore end to the aft end;
   the first mounting rail and the second mounting rail being positioned offset and equidistant from the central axis; and
   the control unit being mounted to the deck by the first mounting rail and the second mounting rail.

7. The motorized watercraft as claimed in claim 1 comprises:

a first lateral light;

a second lateral light;

the floating board comprises a port side and a starboard side;

the port side and the starboard side being positioned opposite to each other across the floating board;

the port side and the starboard side being positioned in between the fore end and the aft end;

the first lateral light being mounted into the port side;

the second lateral light being mounted into the starboard side; and the first lateral light and the second lateral light being electrically connected to the control unit through the plurality of conduit stringers.

8. The motorized watercraft as claimed in claim 1 comprises:

a front light;

a plurality of rear lights;

the front light being mounted into the fore end;

the plurality of rear lights being mounted into the aft end;

the plurality of rear lights being distributed across the aft end; and the front light and the plurality of rear lights being electrically connected to the control unit through the plurality of conduit stringers.

9. The motorized watercraft as claimed in claim 1 comprises:

a plurality of hull lights;

the plurality of hull lights being mounted into the hull, opposite to the deck;

the plurality of hull lights being distributed across the hull; and the plurality of hull lights being electrically connected to the control unit through the plurality of conduit stringers.

10. The motorized watercraft as claimed in claim 1 comprises:

a cleat;

the cleat being mounted adjacent to the deck, opposite to the hull; and the cleat being positioned adjacent to the fore end.

11. The motorized watercraft as claimed in claim 1 comprises:

a first grip;

a second grip;

the floating board comprises a port side and a starboard side;

the port side and the starboard side being positioned opposite to each other across the floating board;

the port side and the starboard side being positioned in between the fore end and the aft end;

the first grip being externally layered over the port side; and the second grip being externally layered over the starboard side.

12. The motorized watercraft as claimed in claim 1 comprises:

a gyroscopic kill switch;

the gyroscopic kill switch being electronically connected to the control unit; and the gyroscopic kill switch being housed within the control unit.

13. The motorized watercraft as claimed in claim 1 comprises:

a control panel;

the control panel being electronically connected to the control unit; and the control panel being mounted into the control unit.

14. The motorized watercraft as claimed in claim 1 comprises:

a remote control;

a wireless communication module;

the wireless communication module being electronically connected to the control unit;

the wireless communication module being housed within the control unit; and the wireless communication module being communicably coupled to the remote control.

* * * * *